(12) United States Patent
Shimada et al.

(10) Patent No.: US 7,825,054 B2
(45) Date of Patent: Nov. 2, 2010

(54) SEMICONDUCTOR PORCELAIN COMPOSITION

(75) Inventors: Takeshi Shimada, Osaka (JP); Kei Matsumoto, Osaka (JP); Koichi Terao, Osaka (JP); Kazuya Toji, Osaka (JP); Kazuhiro Nishikawa, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 209 days.

(21) Appl. No.: 12/063,494

(22) PCT Filed: Aug. 11, 2005

(86) PCT No.: PCT/JP2005/014769

§ 371 (c)(1),
(2), (4) Date: Jun. 13, 2008

(87) PCT Pub. No.: WO2007/023512

PCT Pub. Date: Mar. 1, 2007

(65) Prior Publication Data

US 2009/0233785 A1    Sep. 17, 2009

(51) Int. Cl.
*C04B 35/468* (2006.01)

(52) U.S. Cl. ............... 501/139; 501/137; 252/520.21

(58) Field of Classification Search ............ 501/137, 501/138, 139; 252/520.21
See application file for complete search history.

(56) References Cited

U.S. PATENT DOCUMENTS

| | | | |
|---|---|---|---|
| 3,962,146 A | 6/1976 | Matsuoka et al. | |
| 7,090,785 B2 * | 8/2006 | Chiang et al. | 252/62.9 R |
| 2002/0098968 A1 | 7/2002 | Takahashi et al. | |
| 2008/0170977 A1 * | 7/2008 | Shimada et al. | 423/263 |
| 2009/0105064 A1 * | 4/2009 | Shimada et al. | 501/138 |
| 2010/0012905 A1 * | 1/2010 | Shimada et al. | 252/520.21 |
| 2010/0075824 A1 * | 3/2010 | Shimada | 501/123 |
| 2010/0075825 A1 * | 3/2010 | Shimada et al. | 501/123 |

FOREIGN PATENT DOCUMENTS

| | | |
|---|---|---|
| JP | 50-58106 | 5/1975 |
| JP | 56-169301 | 12/1981 |
| JP | 59-16303 | 1/1984 |
| JP | 2002-160967 | 6/2002 |
| JP | 2005-255493 | 9/2005 |

OTHER PUBLICATIONS

English translation of Search Report issued in International Patent Application No. PCT/JP2005/014769 on Apr. 18, 2006.

Ayumu Aoto et al., "Synthesis and characterization of $(Na_{1/2}Bi_{1/2})TiO_3$- doped $BaTiO_3$ semiconductor ceramics," The Ceramic Society of Japan 2005 Nen Nenkai Koen Yokoshu, Mar. 22, 2005, p. 81.

* cited by examiner

*Primary Examiner*—Karl E Group
(74) *Attorney, Agent, or Firm*—Stein McEwen, LLP

(57) ABSTRACT

The invention intends to provide, in $BaTiO_3$ semiconductor porcelain composition, a semiconductor porcelain composition that, without using Pb, can shift the Curie temperature to a positive direction and can significantly reduce the resistivity at room temperature. According to the invention, when Ba is partially substituted by an A1 element (at least one kind of Na, K and Li) and an A2 element (Bi) and Ba is further substituted by a specific amount of a Q element, or when Ba is partially substituted by an A1 element (at least one kind of Na, K and Li) and an A2 element (Bi) and Ti is partially substituted by a specific amount of an M element, the optimal valence control can be applied and whereby the resistivity at room temperature can be significantly reduced. Accordingly, it is optimal for applications in a PTC thermistor, a PTC heater, a PTC switch, a temperature detector and the like, and particularly preferably in an automobile heater.

3 Claims, No Drawings

US 7,825,054 B2

SEMICONDUCTOR PORCELAIN COMPOSITION

CROSS-REFERENCE TO RELATED APPLICATIONS

This application claims the benefit of PCT International Patent Application No. PCT/JP2005/014769, filed Aug. 11, 2005, and is related to Japanese Patent Application No. 2004-71444, filed Mar. 12, 2004, in the Japanese Patent Office, the disclosures of which are incorporated herein by reference.

TECHNICAL FIELD

The invention relates to a semiconductor porcelain composition for use in a PCT thermistor, a PCT heater, a PCT switch, a temperature detector or the like, which has a positive temperature coefficient of resistivity.

BACKGROUND ART

Conventionally, as materials showing a positive PTCR, there have been proposed compositions in which various semiconductive dopants are added to $BaTiO_3$. Since these compositions have the Curie temperatures around 120° C., these composition need to be shifted in the Curie temperatures depending on the applications.

For example, although it has been proposed to shift Curie temperature by adding $SrTiO_3$ to $BaTiO_3$, in this case, the Curie temperature is shifted only in a negative direction and is not shifted in a positive direction. Only $PbTiO_3$ is known as an additive element for shifting Curie temperature in a positive direction. However, $PbTiO_3$ includes an element for bringing about environmental pollution, and therefore a material which does not use $PbTiO_3$ has been desired in recent years.

In a $BaTiO_3$ semiconductor porcelain, with an object of preventing a reduction in a temperature coefficient of resistivity by Pb substitution, as well as reducing a voltage dependency and promoting a productivity and a reliability, there has been proposed a method of producing a $BaTiO_3$ semiconductor porcelain in which a composition obtained by adding one or more kinds of any of Nb, Ta and a rare earth element to a composition in which x in $Ba_{1-2x}(BiNa)_xTiO_3$ where a portion of Ba of $BaTiO_3$ is substituted by Bi—Na is controlled to a range of $0 \leq x \leq 0.15$, is sintered in nitrogen, and thereafter subjected to a heat treatment in an oxidizing atmosphere.

Patent Reference 1: JP-A-56-169301

DISCLOSURE OF INVENTION

Problem that the Invention is to Solve

In patent reference 1, as an example thereof, a composition obtained by adding 0.1 mol % of $Nd_2O_3$ as a semiconductive dopant to $Ba_{1-2x}(BiNa)_xTiO_3$ ($0 < x \leq 0.15$) is disclosed. However, since addition amounts of other Nb and Ta are not at all described, whether a semiconductor is formed or not is unclear.

In this connection, the inventors have made studies on a composition system where Ba is partially substituted by Bi—Na, which is described in patent reference 1, and found that, in the case of conducting a valence control of the composition, when a trivalent positive ion is added as a semiconductive dopant, a semiconductive effect is deteriorated due to the presence of a monovalent Na ion to result in a problem that the resistivity at room temperature becomes higher, and that, even when 0.1 mol % of the $Nd_2O_3$ is added as a semiconductive dopant in order to overcome the problem, a semiconductor sufficient for use in PTC cannot be realized.

An object of the invention is to provide a semiconductor porcelain composition which can overcome the problems of the conventional $BaTiO_3$ semiconductor porcelain composition, and is capable of shifting a Curie temperature in a positive direction and considerably reducing a resistivity at room temperature without using Pb.

Means for Solving the Problems

The inventors have paid attention to a valence control when Ba is partially substituted by Bi—Na or the like in a $BaTiO_3$ semiconductor porcelain composition and, as a result of intensive studies on a content of an additive element for carrying out the optimum valence control, found that, when Ba is partially substituted by an A1 element (at least one kind of Na, K and Li) and an A2 element (Bi) and Ba is further substituted by a specific amount of a Q element, the optimum valence control can be carried out and whereby the resistivity at room temperature can be significantly reduced.

Furthermore, the inventors found that, when Ba is partially substituted by an A1 element (at least one kind of Na, K and Li) and an A2 element (Bi) and Ti is partially substituted by a specific amount of an M element, advantages same as the above can be obtained, and that, in this case, with a substitution amount less than a substitution amount with the Q element, the valence control can be advantageously carried out, whereby the invention has been completed.

That is, the invention provides a semiconductor porcelain composition having a composition formula represented by $[(A1_{0.5}A2_{0.5})_x(Ba_{1-y}Q_y)_{1-x}]TiO_3$ (in which A1 is at least one kind of Na, K and Li, A2 is Bi, and Q is at least one kind of La, Dy, Eu and Gd), in which x and y each satisfy $0 < x \leq 0.2$ and $0.002 \leq y \leq 0.01$, and more preferably, y satisfies $0.005 \leq y \leq 0.01$.

Furthermore, the invention also relates to a semiconductor porcelain composition having a composition formula represented by $[(A1_{0.5}A2_{0.5})_xBa_{1-x}][Ti_{1-z}M_z]O_3$ (in which, A1 is at least one kind of Na, K and Li, A2 is Bi, and M is at least one kind of Nb, Ta and Sb), in which x and z each satisfy $0 < x \leq 0.2$ and $0 < z \leq 0.01$, and more preferably, z satisfies $0 < z \leq 0.005$.

Still furthermore, the invention also relates to a semiconductor porcelain composition in which 3.0 mol % or less of a Si oxide and 4.0 mol % or less of a Ca oxide are added in each of the semiconductor porcelain compositions having the above configurations.

Advantage of the Invention

According to the invention, there can be provided, in a $BaTiO_3$ semiconductor porcelain composition, a semiconductor porcelain composition which is capable of shifting the Curie temperature and has a significantly reduced resistivity at room temperature without using Pb which brings about an environmental pollution.

Since the $BaTiO_3$ semiconductor porcelain composition according to the invention has resistivity characteristics in which the resistivity at room temperature and in a range reaching to a predetermined temperature is sufficiently low and, in a target temperature region, the resistivity rapidly becomes higher, it is optimal for applications in a PTC thermistor, a PTC heater, a PTC switch, a temperature detector and the like, and particularly preferably in an automobile heater.

BEST MODE FOR CARRYING OUT THE INVENTION

One of the Characteristics of the invention is that Ba is partially substituted by an A1 element (at least one kind of Na, K and Li) and an A2 element (Bi) to shift the Curie temperature to a positive direction and, in order to optimally control a valence disturbed due to the substitution by A1 and A2 elements, Ba is partially substituted by a specific amount of a Q element (at least one kind of La, Dy, Eu and Gd) to obtain a $[(A1_{0.5}A2_{0.5})_x(Ba_{1-y}Q_y)_{1-x}]TiO_3$ composition, or Ti is partially substituted by a specific amount of an M element to obtain a $[(A1_{0.5}A2_{0.5})_xBa_{1-x}][Ti_{1-z}M_z]O_3$ composition.

The reasons of limiting the respective compositions are as follows.

In the $[(A1_{0.5}A2_{0.5})_x(Ba_{1-y}Q_y)_{1-x}]TiO_3$ composition, A1 is at least one kind of Na, K and Li, A2 is Bi, and Q is at least one kind of La, Dy, Eu and Gd. Preferably, A1 is Na and Q is La.

In the above-mentioned composition formula, x represents a component range of A1+A2 and is preferably in the range of $0<x\leq0.2$. When x is zero, the Curie temperature cannot be shifted to a high temperature side, and when x exceeds 0.2, the resistivity at room temperature unfavorably exceeds $10^3$ Ωcm.

Furthermore, in the composition formula, y represents a component range of Q and is preferably in the range of $0.002\leq y\leq0.01$. When y is less than 0.002, the valence control in the composition becomes insufficient and the resistivity at room temperature exceeds $10^3$ Ωcm. Furthermore, when y exceeds 0.01, the composition becomes insulative and the resistivity at room temperature unfavorably exceeds $10^3$ Ωcm. A preferable range thereof is $0.005\leq y\leq0.01$ and, in this case, the resistivity at room temperature can be further reduced. The above range, $0.002\leq y\leq0.01$ is expressed as 0.2 mol % to 1.0 mol % in terms of mol %.

In the $[(A1_{0.5}A2_{0.5})_xBa_{1-x}][Ti_{1-z}M_z]O_3$ composition, A1 is at least one kind of Na, K and Li, A2 is Bi, and M is at least one kind of Nb, Ta and Sb. Preferably, A1 is Na and M is Nb.

In the above-mentioned composition formula, x represents a component range of A1+A2 and is preferably in the range of $0<x\leq0.2$. When x is zero, the Curie temperature cannot be shifted to a high temperature side, and when it exceeds 0.2, the resistivity at room temperature unfavorably exceeds $10^3$ Ωcm. Furthermore, z represents a component range of M and is preferably in the range of $0<z\leq0.01$. When z is zero, the valence control cannot be applied and the composition cannot form a semiconductor, and when it exceeds 0.01, the resistivity at room temperature unfavorably exceeds $10^3$ Ωcm. More preferably, z is in the range of $0<z\leq0.005$. The above range, $0<z\leq0.01$, is expressed as 0 to 1 mol % (not including 0), in terms of mol %.

In the case of the above-mentioned $[(A1_{0.5}A2_{0.5})_xBa_{1-x}][Ti_{1-z}M_z]O_3$ composition, in order to control the valence, Ti is substituted by an M element. In this case, since an M element is added (preferable addition amount: $0<z\leq0.005$) in order to control a valence at Ti site that is a tetravalent element, the valence control can be carried out with a smaller amount than an addition amount ($0.002\leq y\leq0.01$) of the Q element in the above-mentioned $[(A1_{0.5}A2_{0.5})_x(Ba_{1-y}Q_y)_{1-x}]TiO_3$ composition; accordingly, the internal strain of the composition according to the invention can be advantageously alleviated.

In the above-mentioned $[(A1_{0.5}A2_{0.5})_x(Ba_{1-y}Q_y)_{1-x}]TiO_3$ composition and $[(A1_{0.5}A2_{0.5})_xBa_{1-x}][Ti_{1-z}M_z]O_3$ composition, the sinterability at low temperature can be improved by adding 3.0 mol % or less of a Si oxide and 4.0 mol % or less of a Ca oxide. When each of the oxides is added exceeding the upper limit, the composition unfavorably does not become a semiconductor.

An example of a process for producing a semiconductor porcelain composition of the invention will be described below.

(1) Oxide powders of the respective elements are prepared, weighed and then mixed.

(2) The mixture is further mixed in pure water or ethanol, and then dried to obtain a mixed powder.

(3) The mixed powder is calcined at a temperature in the range of 900 to 1100° C. for 2 to 6 hr.

(4) The calcined product is pulverized in pure water or ethanol, followed drying.

(5) The pulverized powder is granulated with PVA or the like, and then formed by means of a uniaxial press.

(6) The green compact is degreased at a temperature in the range of 300 to 700° C., and then sintered in air or a reducing atmosphere at a temperature in the range of 1200 to 1450° C. for 2 to 6 hr.

EXAMPLES

Example 1

The respective powders of $BaCO_3$ and $TiO_2$ as main raw materials; $La_2O_3$, $Dy_2O_3$, $Eu_2O_3$, $Gd_2O_3$, $Nb_2O_5$, $Ta_2O_5$ and $Sb_2O_3$ as semiconductive dopants; $SiO_2$ and $CaO$ as sintering aides; and $(Na_2CO_3.Bi_2O_3.TiO_2)$, $(K_2CO_3.Bi_2O_3.TiO_2)$ and $(Li_2CO_3.Bi_2O_3.TiO_2)$ as Curie temperature shifters were prepared. These respective powders were blended as shown in Tables 1 through 6, mixed in pure water and then dried to thereby obtain mixed powders having an average particle diameter in the range of 0.6 to 1.2 µm.

In the next place, the mixed powders each were calcined, depending on the compositions, at a temperature in the range of 900 to 1100° C. for 2 to 6 hr. The calcined powders thus obtained each were pulverized in pure water until an average particle diameter becomes in the range of 0.8 to 1.5 µm, and the pulverized powders each were dried. Then, after PVA was added and mixed, the dried powders each were granulated by means of a granulating device.

The granulated powders thus obtained each were formed to have a forming density in the range of 2 to 3 g/cm³ by use of a uniaxial press. The green compacts thus obtained each were degreased at a temperature in the range of 300 to 700° C. and subsequently sintered at a temperature in the range of 1300 to 1360° C. for 4 hr in an atmosphere having an oxygen concentration of 75% to thereby obtain sintered bodies.

The sintered bodies thus obtained each were processed into a plate of 10 mm×10 mm×0.1 mm to thereby obtain test pieces. In the measurement of the resistance of the test piece, a variation of resistance value in a range from room temperature to 200° C. was measured. Measurement results are shown in Tables 1 through 6.

Nos. 1 through 29 in Table 1 show a case of $[(A1_{0.5}Bi_{0.5})_xBa_{1-x}][Ti_{1-z}Nb_z]O_3$ composition; Nos. 30 through 56 in Table 2 show a case of $[(A1_{0.5}Bi_{0.5})_xBa_{1-x}][Ti_{1-z}Sb_z]O_3$ composition; Nos. 57 through 86 in Table 3 show a case of $[(A1_{0.5}Bi_{0.5})_x(Ba_{1-y}La_y)_{1-x}]TiO_3$ composition; Nos. 87 through 102 in Table 4 show a case of $[(A1_{0.5}Bi_{0.5})_x(Ba_{1-y}Gd_y)_{1-x}]TiO_3$ composition; Nos. 103 through 118 in Table 5 show a case of $[(A1_{0.5}Bi_{0.5})_x$ $(Ba_{1-y}Eu_y)_{1-x}]TiO_3$ composition; and Nos. 119 through 134 in Table 6 show a case of $[(Al_{0.5}Bi_{0.5})_x(Ba_{1-y}Dy_y)_{1-x}]TiO_3$ composition.

Comparative Example 1

In Tables 1 through 6, columns provided with an * mark indicate comparative examples. That is, Nos. 1 through 4 and 11 in Table 1, Nos. 30, 31 and 44 in Table 2, Nos. 57 and 58 in Table 3, Nos. 87 and 88 in Table 4, Nos. 103 and 104 in Table 5 and Nos. 119 and 120 in Table 6 are comparative examples.

Example 2

The respective powders of $BaCO_3$ and $TiO_2$ as main raw materials; $La_2O_3$ and $Nb_2O_5$ as semiconductive dopants; and $(Na_2CO_3 \cdot Bi_2O_3 \cdot TiO_2)$ as the Curie temperature shifter were prepared. The respective powder were blended as shown in Tables 7 and 8, mixed in pure water and then dried to thereby obtain mixed powders having an average particle diameter in the range of 0.6 to 1.2 μm.

In the next place, the mixed powders each were calcined, depending on the compositions, at a temperature in the range of 900 to 1100° C. for 2 to 6 hr. The calcined powders thus obtained each were pulverized in pure water until an average particle diameter becomes in the range of 0.8 to 1.5 μm, and the pulverized powders each were dried. Then, after PVA was added and mixed, the dried powders each were granulated by means of a granulating device.

The granulated powders thus obtained each were formed to have a forming density in the range of 2 to 3 g/cm³ by use of a uniaxial press. The green compacts thus obtained each were degreased at a temperature in the range of 300 to 700° C. and subsequently sintered at a temperature in the range of 1300 to 1360° C. for 4 hr in an atmosphere having an oxygen concentration of 75% to thereby obtain sintered bodies.

The sintered bodies thus obtained each were processed into a plate of 10 mm×10 mm×0.1 mm to thereby obtain test pieces. In the measurement of the resistance of the test piece, a variation of resistance value in a range from room temperature to 200° C. was measured. Measurement results are shown in Tables 7 through 8.

Nos. 135 through 144 in Table 7 show a case of $[(Al_{0.5}Bi_{0.5})_xBa_{1-x}][Ti_{1-z}Nb_z]O_3$ composition and Nos. 145 through 154 in Table 8 show a case of $[(Al_{0.5}Bi_{0.5})_x(Ba_{1-y}La_y)_{1-x}]TiO_3$ composition.

Comparative Example 2

In Tables 7 through 8, columns provided with an * mark indicate comparative examples. That is, Nos. 135 and 136 in Table 7 and Nos. 145 and 146 in Table 8 are comparative examples.

As obvious from Tables 1 through 8, it is found that semiconductor porcelain compositions according to the invention can elevate the Curie temperature without using Pb and can significantly reduce the resistivity at room temperature.

TABLE 1

| No. | Al = $Na_{1-a-b}K_aLi_b$ a | b | x | z | $SiO_2$ (mol %) | CaO (mol %) | ρ30 (Ωcm) | Tc (° C.) |
|---|---|---|---|---|---|---|---|---|
| 1* | 0 | 0 | 0 | 0 | 0.9 | 1.9 | Insulator | — |
| 2* | 0 | 0 | 0 | 0.002 | 0.9 | 1.9 | 200 | 110 |
| 3* | 0 | 0 | 0 | 0.005 | 0.9 | 1.9 | 3.6 | 111 |

TABLE 1-continued

| No. | Al = $Na_{1-a-b}K_aLi_b$ a | b | x | z | $SiO_2$ (mol %) | CaO (mol %) | ρ30 (Ωcm) | Tc (° C.) |
|---|---|---|---|---|---|---|---|---|
| 4* | 0 | 0 | 0 | 0.01 | 0.9 | 1.9 | 4.1 | 115 |
| 5 | 0 | 0 | 0.02 | 0.002 | 0.9 | 1.9 | 150 | 130 |
| 6 | 0 | 0 | 0.02 | 0.005 | 0.9 | 1.9 | 119 | 130 |
| 7 | 0 | 0 | 0.02 | 0.01 | 0.9 | 1.9 | 131 | 135 |
| 8 | 0 | 0 | 0.06 | 0.002 | 0.9 | 1.9 | 91 | 160 |
| 9 | 0 | 0 | 0.06 | 0.005 | 0.9 | 1.9 | 73 | 160 |
| 10 | 0 | 0 | 0.06 | 0.01 | 0.9 | 1.9 | 86 | 163 |
| 11* | 0 | 0 | 0.06 | 0.012 | 0.9 | 1.9 | 89 | 161 |
| 12 | 0 | 0 | 0.1 | 0.002 | 0.9 | 1.9 | 93 | 173 |
| 13 | 0 | 0 | 0.1 | 0.005 | 0.9 | 1.9 | 84 | 173 |
| 14 | 0 | 0 | 0.1 | 0.01 | 0.9 | 1.9 | 97 | 175 |
| 15 | 0 | 0 | 0.2 | 0.002 | 0.9 | 1.9 | 156 | 181 |
| 16 | 0 | 0 | 0.2 | 0.005 | 0.9 | 1.9 | 93 | 181 |
| 17 | 0 | 0 | 0.2 | 0.01 | 0.9 | 1.9 | 128 | 183 |
| 18 | 0.4 | 0 | 0.02 | 0.005 | 0.9 | 1.9 | 78 | 125 |
| 19 | 0.4 | 0 | 0.06 | 0.005 | 0.9 | 1.9 | 89 | 154 |
| 20 | 0.4 | 0 | 0.1 | 0.005 | 0.9 | 1.9 | 55 | 162 |
| 21 | 0.4 | 0 | 0.2 | 0.005 | 0.9 | 1.9 | 82 | 176 |
| 22 | 0.8 | 0 | 0.02 | 0.005 | 0.9 | 1.9 | 86 | 120 |
| 23 | 0.8 | 0 | 0.06 | 0.005 | 0.9 | 1.9 | 99 | 141 |
| 24 | 0.8 | 0 | 0.1 | 0.005 | 0.9 | 1.9 | 78 | 153 |
| 25 | 0.8 | 0 | 0.2 | 0.005 | 0.9 | 1.9 | 98 | 166 |
| 26 | 0.2 | 0.2 | 0.02 | 0.005 | 0.9 | 1.9 | 70 | 121 |
| 27 | 0.2 | 0.2 | 0.06 | 0.005 | 0.9 | 1.9 | 81 | 139 |
| 28 | 0.2 | 0.2 | 0.1 | 0.005 | 0.9 | 1.9 | 49 | 150 |
| 29 | 0.2 | 0.2 | 0.2 | 0.005 | 0.9 | 1.9 | 100 | 162 |

TABLE 2

| No. | Al = $Na_{1-a-b}K_aLi_b$ a | b | x | z | $SiO_2$ (mol %) | CaO (mol %) | ρ30 (Ωcm) | Tc (° C.) |
|---|---|---|---|---|---|---|---|---|
| 30* | 0 | 0 | 0 | 0 | 0.9 | 1.9 | Insulator | — |
| 31* | 0 | 0 | 0 | 0.005 | 0.9 | 1.9 | 3.6 | 110 |
| 32 | 0 | 0 | 0.02 | 0.002 | 0.9 | 1.9 | 54 | 129 |
| 33 | 0 | 0 | 0.02 | 0.005 | 0.9 | 1.9 | 31 | 130 |
| 34 | 0 | 0 | 0.02 | 0.01 | 0.9 | 1.9 | 85 | 133 |
| 35 | 0 | 0 | 0.06 | 0.002 | 0.9 | 1.9 | 92 | 158 |
| 36 | 0 | 0 | 0.06 | 0.005 | 0.9 | 1.9 | 80 | 160 |
| 37 | 0 | 0 | 0.06 | 0.01 | 0.9 | 1.9 | 96 | 163 |
| 38 | 0 | 0 | 0.1 | 0.002 | 0.9 | 1.9 | 90 | 173 |
| 39 | 0 | 0 | 0.1 | 0.005 | 0.9 | 1.9 | 98 | 172 |
| 40 | 0 | 0 | 0.1 | 0.01 | 0.9 | 1.9 | 102 | 172 |
| 41 | 0 | 0 | 0.2 | 0.002 | 0.9 | 1.9 | 210 | 181 |
| 42 | 0 | 0 | 0.2 | 0.005 | 0.9 | 1.9 | 111 | 180 |
| 43 | 0 | 0 | 0.2 | 0.01 | 0.9 | 1.9 | 318 | 181 |
| 44* | 0 | 0 | 0.25 | 0.005 | 0.9 | 1.9 | Insulator | — |
| 45 | 0.4 | 0 | 0.02 | 0.005 | 0.9 | 1.9 | 47 | 121 |
| 46 | 0.4 | 0 | 0.06 | 0.005 | 0.9 | 1.9 | 34 | 149 |
| 47 | 0.4 | 0 | 0.1 | 0.005 | 0.9 | 1.9 | 22 | 162 |
| 48 | 0.4 | 0 | 0.2 | 0.005 | 0.9 | 1.9 | 84 | 177 |
| 49 | 0.8 | 0 | 0.02 | 0.005 | 0.9 | 1.9 | 76 | 122 |
| 50 | 0.8 | 0 | 0.06 | 0.005 | 0.9 | 1.9 | 74 | 141 |
| 51 | 0.8 | 0 | 0.1 | 0.005 | 0.9 | 1.9 | 79 | 152 |
| 52 | 0.8 | 0 | 0.2 | 0.005 | 0.9 | 1.9 | 168 | 164 |
| 53 | 0.2 | 0.2 | 0.02 | 0.005 | 0.9 | 1.9 | 101 | 118 |
| 54 | 0.2 | 0.2 | 0.06 | 0.005 | 0.9 | 1.9 | 105 | 137 |
| 55 | 0.2 | 0.2 | 0.1 | 0.005 | 0.9 | 1.9 | 92 | 148 |
| 56 | 0.1 | 0.2 | 0.2 | 0.005 | 0.9 | 1.9 | 168 | 160 |

TABLE 3

| No. | A1 = Na$_{1-a-b}$K$_a$Li$_b$ a | b | x | y | SiO$_2$ (mol %) | CaO (mol %) | ρ30 (Ωcm) | Tc (° C.) |
|---|---|---|---|---|---|---|---|---|
| 57* | 0 | 0 | 0 | 0 | 0.9 | 1.9 | Insulator | — |
| 58* | 0 | 0 | 0 | 0.005 | 0.9 | 1.9 | 233 | 110 |
| 59 | 0 | 0 | 0.02 | 0.002 | 0.9 | 1.9 | 61 | 132 |
| 60 | 0 | 0 | 0.02 | 0.005 | 0.9 | 1.9 | 49 | 132 |
| 61 | 0 | 0 | 0.02 | 0.008 | 0.9 | 1.9 | 29 | 132 |
| 62 | 0 | 0 | 0.02 | 0.001 | 0.9 | 1.9 | 63 | 134 |
| 63 | 0 | 0 | 0.06 | 0.002 | 0.9 | 1.9 | 83 | 161 |
| 64 | 0 | 0 | 0.06 | 0.005 | 0.9 | 1.9 | 59 | 162 |
| 65 | 0 | 0 | 0.06 | 0.008 | 0.9 | 1.9 | 41 | 161 |
| 66 | 0 | 0 | 0.06 | 0.01 | 0.9 | 1.9 | 50 | 162 |
| 67 | 0 | 0 | 0.1 | 0.002 | 0.9 | 1.9 | 56 | 170 |
| 68 | 0 | 0 | 0.1 | 0.005 | 0.9 | 1.9 | 78 | 170 |
| 69 | 0 | 0 | 0.1 | 0.008 | 0.9 | 1.9 | 79 | 171 |
| 70 | 0 | 0 | 0.1 | 0.01 | 0.9 | 1.9 | 80 | 173 |
| 71 | 0 | 0 | 0.2 | 0.002 | 0.9 | 1.9 | 36 | 179 |
| 72 | 0 | 0 | 0.2 | 0.005 | 0.9 | 1.9 | 58 | 179 |
| 73 | 0 | 0 | 0.2 | 0.008 | 0.9 | 1.9 | 54 | 181 |
| 74 | 0 | 0 | 0.2 | 0.01 | 0.9 | 1.9 | 76 | 182 |
| 75 | 0.4 | 0 | 0.02 | 0.005 | 0.9 | 1.9 | 53 | 122 |
| 76 | 0.4 | 0 | 0.06 | 0.005 | 0.9 | 1.9 | 97 | 151 |
| 77 | 0.4 | 0 | 0.1 | 0.005 | 0.9 | 1.9 | 99 | 159 |
| 78 | 0.4 | 0 | 0.2 | 0.005 | 0.9 | 1.9 | 125 | 172 |
| 79 | 0.8 | 0 | 0.02 | 0.005 | 0.9 | 1.9 | 56 | 119 |
| 80 | 0.8 | 0 | 0.06 | 0.005 | 0.9 | 1.9 | 91 | 139 |
| 81 | 0.8 | 0 | 0.1 | 0.005 | 0.9 | 1.9 | 140 | 150 |
| 82 | 0.8 | 0 | 0.2 | 0.005 | 0.9 | 1.9 | 126 | 164 |
| 83 | 0.2 | 0.2 | 0.02 | 0.005 | 0.9 | 1.9 | 59 | 123 |
| 84 | 0.2 | 0.2 | 0.06 | 0.005 | 0.9 | 1.9 | 68 | 137 |
| 85 | 0.2 | 0.2 | 0.1 | 0.005 | 0.9 | 1.9 | 151 | 153 |
| 86 | 0.2 | 0.2 | 0.2 | 0.005 | 0.9 | 1.9 | 160 | 163 |

TABLE 4

| No. | A1 = Na$_{1-a-b}$K$_a$Li$_b$ a | b | x | y | SiO$_2$ (mol %) | CaO (mol %) | ρ30 (Ωcm) | Tc (° C.) |
|---|---|---|---|---|---|---|---|---|
| 87* | 0 | 0 | 0 | 0 | 0.9 | 1.9 | Insulator | — |
| 88* | 0 | 0 | 0 | 0.005 | 0.9 | 1.9 | 23 | 112 |
| 89 | 0 | 0 | 0.02 | 0.005 | 0.9 | 1.9 | 28 | 133 |
| 90 | 0 | 0 | 0.02 | 0.01 | 0.9 | 1.9 | 91 | 131 |
| 91 | 0 | 0 | 0.06 | 0.005 | 0.9 | 1.9 | 44 | 160 |
| 92 | 0 | 0 | 0.06 | 0.01 | 0.9 | 1.9 | 87 | 162 |
| 93 | 0 | 0 | 0.1 | 0.005 | 0.9 | 1.9 | 56 | 171 |
| 94 | 0 | 0 | 0.1 | 0.01 | 0.9 | 1.9 | 99 | 171 |
| 95 | 0 | 0 | 0.2 | 0.005 | 0.9 | 1.9 | 89 | 177 |
| 96 | 0 | 0 | 0.2 | 0.01 | 0.9 | 1.9 | 119 | 181 |
| 97 | 0.4 | 0 | 0.06 | 0.005 | 0.9 | 1.9 | 67 | 150 |
| 98 | 0.4 | 0 | 0.2 | 0.005 | 0.9 | 1.9 | 72 | 170 |
| 99 | 0.8 | 0 | 0.06 | 0.005 | 0.9 | 1.9 | 66 | 141 |
| 100 | 0.8 | 0 | 0.2 | 0.005 | 0.9 | 1.9 | 96 | 165 |
| 101 | 0.2 | 0.2 | 0.06 | 0.005 | 0.9 | 1.9 | 97 | 139 |
| 102 | 0.2 | 0.2 | 0.2 | 0.005 | 0.9 | 1.9 | 72 | 164 |

TABLE 5

| No. | A1 = Na$_{1-a-b}$K$_a$Li$_b$ a | b | x | y | SiO$_2$ (mol %) | CaO (mol %) | ρ30 (Ωcm) | Tc (° C.) |
|---|---|---|---|---|---|---|---|---|
| 103* | 0 | 0 | 0 | 0 | 0.9 | 1.9 | Insulator | — |
| 104* | 0 | 0 | 0 | 0.005 | 0.9 | 1.9 | 48 | 110 |
| 105 | 0 | 0 | 0.02 | 0.005 | 0.9 | 1.9 | 66 | 129 |
| 106 | 0 | 0 | 0.02 | 0.01 | 0.9 | 1.9 | 100 | 129 |
| 107 | 0 | 0 | 0.06 | 0.005 | 0.9 | 1.9 | 79 | 159 |
| 108 | 0 | 0 | 0.06 | 0.01 | 0.9 | 1.9 | 136 | 160 |
| 109 | 0 | 0 | 0.1 | 0.005 | 0.9 | 1.9 | 71 | 169 |
| 110 | 0 | 0 | 0.1 | 0.01 | 0.9 | 1.9 | 118 | 171 |
| 111 | 0 | 0 | 0.2 | 0.005 | 0.9 | 1.9 | 78 | 175 |
| 112 | 0 | 0 | 0.2 | 0.01 | 0.9 | 1.9 | 155 | 179 |
| 113 | 0.4 | 0 | 0.06 | 0.005 | 0.9 | 1.9 | 99 | 151 |
| 114 | 0.4 | 0 | 0.2 | 0.005 | 0.9 | 1.9 | 225 | 169 |
| 115 | 0.8 | 0 | 0.06 | 0.005 | 0.9 | 1.9 | 98 | 140 |
| 116 | 0.8 | 0 | 0.2 | 0.005 | 0.9 | 1.9 | 264 | 165 |
| 117 | 0.2 | 0.2 | 0.06 | 0.005 | 0.9 | 1.9 | 117 | 140 |
| 118 | 0.2 | 0.2 | 0.2 | 0.005 | 0.9 | 1.9 | 310 | 166 |

TABLE 6

| No. | A1 = Na$_{1-a-b}$K$_a$Li$_b$ a | b | x | y | SiO$_2$ (mol %) | CaO (mol %) | ρ30 (Ωcm) | Tc (° C.) |
|---|---|---|---|---|---|---|---|---|
| 119* | 0 | 0 | 0 | 0 | 0.9 | 1.9 | Insulator | — |
| 120* | 0 | 0 | 0 | 0.005 | 0.9 | 1.9 | 122 | 111 |
| 121 | 0 | 0 | 0.02 | 0.005 | 0.9 | 1.9 | 127 | 130 |
| 122 | 0 | 0 | 0.02 | 0.01 | 0.9 | 1.9 | 399 | 129 |
| 123 | 0 | 0 | 0.06 | 0.005 | 0.9 | 1.9 | 94 | 163 |
| 124 | 0 | 0 | 0.06 | 0.01 | 0.9 | 1.9 | 392 | 164 |
| 125 | 0 | 0 | 0.1 | 0.005 | 0.9 | 1.9 | 100 | 170 |
| 126 | 0 | 0 | 0.1 | 0.01 | 0.9 | 1.9 | 490 | 169 |
| 127 | 0 | 0 | 0.2 | 0.005 | 0.9 | 1.9 | 101 | 174 |
| 128 | 0 | 0 | 0.2 | 0.01 | 0.9 | 1.9 | 323 | 182 |
| 129 | 0.4 | 0 | 0.06 | 0.005 | 0.9 | 1.9 | 112 | 152 |
| 130 | 0.4 | 0 | 0.2 | 0.005 | 0.9 | 1.9 | 438 | 171 |
| 131 | 0.8 | 0 | 0.06 | 0.005 | 0.9 | 1.9 | 125 | 140 |
| 132 | 0.8 | 0 | 0.2 | 0.005 | 0.9 | 1.9 | 482 | 164 |
| 133 | 0.2 | 0.2 | 0.06 | 0.005 | 0.9 | 1.9 | 149 | 141 |
| 134 | 0.2 | 0.2 | 0.2 | 0.005 | 0.9 | 1.9 | 587 | 163 |

TABLE 7

| No. | A1 = Na$_{1-a-b}$K$_a$Li$_b$ a | b | x | z | SiO$_2$ (mol %) | CaO (mol %) | ρ30 (Ωcm) | Tc (° C.) |
|---|---|---|---|---|---|---|---|---|
| 135* | 0 | 0 | 0 | 0 | 0 | 0 | Insulator | — |
| 136* | 0 | 0 | 0 | 0.005 | 0 | 0 | 88 | 110 |
| 137 | 0 | 0 | 0.02 | 0.005 | 0 | 0 | 94 | 132 |
| 138 | 0 | 0 | 0.02 | 0.01 | 0 | 0 | 108 | 131 |
| 139 | 0 | 0 | 0.06 | 0.005 | 0 | 0 | 81 | 161 |
| 140 | 0 | 0 | 0.06 | 0.01 | 0 | 0 | 184 | 165 |
| 141 | 0 | 0 | 0.1 | 0.005 | 0 | 0 | 116 | 169 |
| 142 | 0 | 0 | 0.1 | 0.01 | 0 | 0 | 141 | 170 |
| 143 | 0 | 0 | 0.2 | 0.005 | 0 | 0 | 109 | 176 |
| 144 | 0 | 0 | 0.2 | 0.01 | 0 | 0 | 186 | 183 |

TABLE 8

| No. | A1 = Na$_{1-a-b}$K$_a$Li$_b$ a | b | x | y | SiO$_2$ (mol %) | CaO (mol %) | ρ30 (Ωcm) | Tc (° C.) |
|---|---|---|---|---|---|---|---|---|
| 145* | 0 | 0 | 0 | 0 | 0 | 0 | Insulator | — |
| 146* | 0 | 0 | 0 | 0.005 | 0 | 0 | 333 | 111 |
| 147 | 0 | 0 | 0.02 | 0.002 | 0 | 0 | 82 | 131 |
| 148 | 0 | 0 | 0.02 | 0.005 | 0 | 0 | 72 | 131 |
| 149 | 0 | 0 | 0.02 | 0.008 | 0 | 0 | 69 | 132 |
| 150 | 0 | 0 | 0.02 | 0.001 | 0 | 0 | 91 | 133 |
| 151 | 0 | 0 | 0.06 | 0.002 | 0 | 0 | 103 | 161 |
| 152 | 0 | 0 | 0.06 | 0.005 | 0 | 0 | 88 | 160 |

TABLE 8-continued

| No. | A1 = $Na_{1-a-b}K_aLi_b$ | | x | y | $SiO_2$ (mol %) | CaO (mol %) | ρ30 (Ωcm) | Tc (° C.) |
|---|---|---|---|---|---|---|---|---|
| | a | b | | | | | | |
| 153 | 0 | 0 | 0.06 | 0.008 | 0 | 0 | 70 | 161 |
| 154 | 0 | 0 | 0.06 | 0.01 | 0 | 0 | 86 | 160 |

INDUSTRIAL APPLICABILITY

According to the semiconductor porcelain composition of the invention, since the Curie temperature can be elevated and the resistivity at room temperature can be significantly reduced without using Pb that causes an environmental pollution, it can be utilized in a PTC thermistor, a PTC heater, a PTC switch, a temperature detector and the like. In particular, it is optimal for applications in automobile heaters and the like, in which an adverse affect on human bodies is feared.

The invention claimed is:

1. A semiconductor porcelain composition having a composition formula represented by $[(A1_{0.5}A2_{0.5})_x(Ba_{1-y}Q_y)_{1-x}]TiO_3$, wherein A1 is at least one of Na, K and Li, A2 is Bi, and Q is at least one of La, Dy, Eu and Gd, and wherein x and y each satisfy $0<x\leqq0.2$ and $0.002\leqq y\leqq0.01$.

2. The semiconductor porcelain composition according to claim 1, wherein y satisfies $0.005\leqq y\leqq0.01$.

3. The semiconductor porcelain composition according to claim 1, wherein 3.0 mol % or less of a Si oxide and 4.0 mol % or less of a Ca oxide are added.

* * * * *